United States Patent Office 3,579,651
Patented May 25, 1971

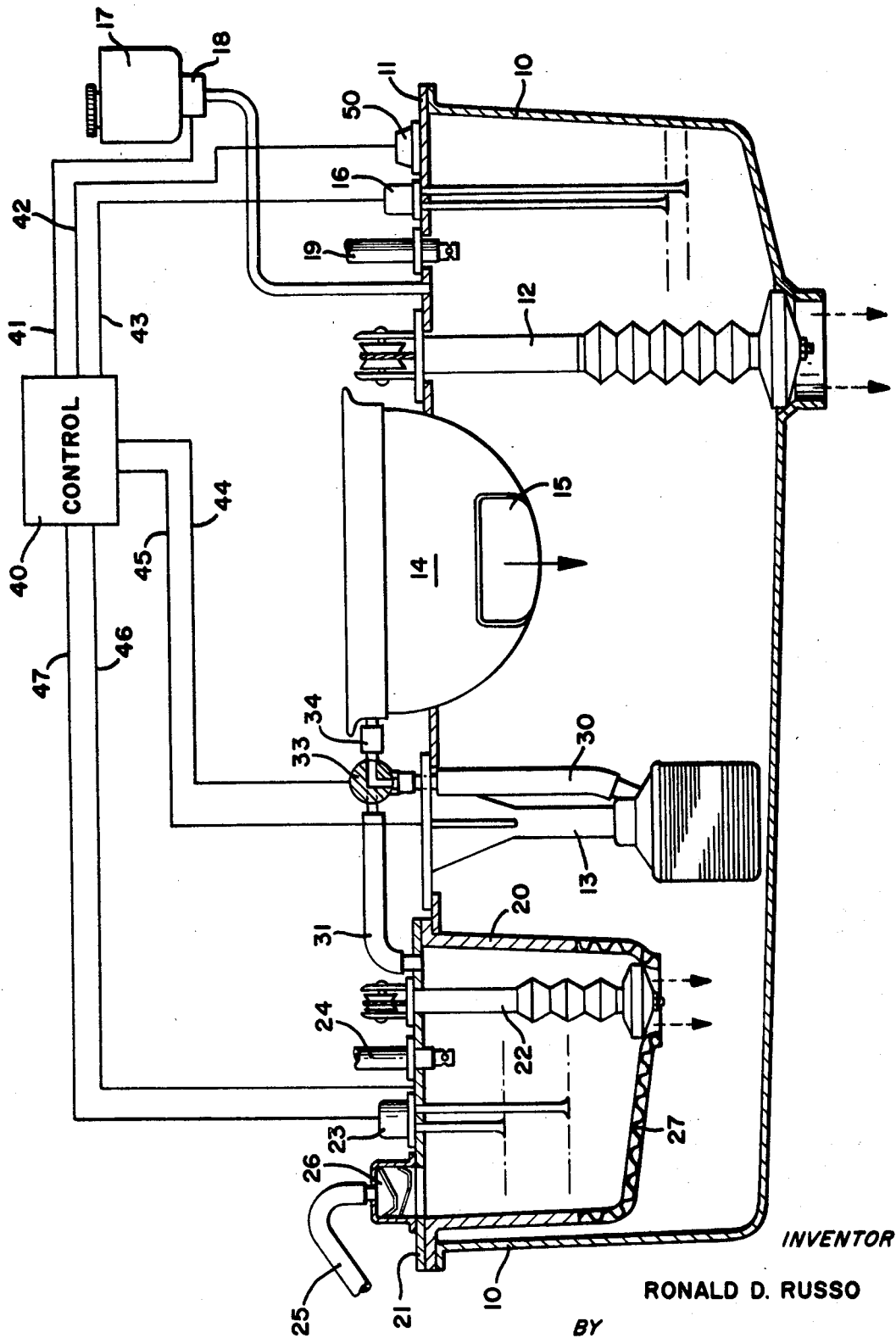

3,579,651
SELF-CONTAINED SEWERAGE SYSTEM
Ronald D. Russo, Wethersfield, Conn., assignor to Koehler-Dayton, Inc., Dayton, Ohio
Filed Nov. 28, 1969, Ser. No. 880,725
Int. Cl. E03d 7/00; B01d 33/02
U.S. Cl. 4—78          11 Claims

ABSTRACT OF THE DISCLOSURE

In a self-contained sewerage system of the type in which the sewage is accumulated and stored within the system and recirculated for flushing, when the level of liquid and solid wastes within the collection tank reaches a preset level, the liquid wastes are withdrawn from the tank and pumped to an evaporative still where they are evaporated and vented from the system.

BACKGROUND OF THE INVENTION

Sewage disposal systems of the type described in Pat. No. 3,067,433 have found wide acceptance, particularly in mobile environments such as the airline industry. In sewage systems of this type, a closed tank is provided with a bowl mounted on the tank and discharging into the tank. The tank is primed with water and chemical additives for odor and color control and the liquid contents of the tank are filtered and recirculated through the bowl for flushing purposes.

Obviously in this type of system, where there is no provision for disposal of waste, servicing of the system must be scheduled at frequent intervals.

SUMMARY OF THE INVENTION

The frequency with which a self-contained sewerage system must be serviced has been appreciably decreased by modifying the system so that a portion of the liquid wastes is evaporated from the system as the level of total wastes in the system reaches a predetermined value. Since the ratio of liquid to solid waste in a typical installation may be approximately 14 to 1 it will readily be seen that, although the solids are still accumulated within the system, the intervals between servicing are extended appreciably. Since the wastes in the collection tank are treated with chemical additives to control odor and color the coliform bacterial count will generally be very low. Additionally, due to the fact that the liquid wastes are heated in order to dispose of them by evaporation, a further safeguard is provided and any possibility of any bacteria remaining in the vented waste is substantially lessened.

BRIEF DESCRIPTION OF THE DRAWING

The single figure of the drawing is a cross sectional view of a self-contained sewerage system embodying the present invention.

DESCRIPTION OF THE PREFERRED EMBODIMENTS

As seen in the drawing, the self-contained sewerage system comprises a closed tank 10 provided with a suitable cover 11 in sealing relationship therewith, drainage means 12, a recirculating pump 13, and a bowl 14 mounted on the tank for discharge thereinto through the discharge opening 15. All of the elements thus far described, including the drainage means 12, pump 13 and bowl 14 may be and preferably are of the same general type disclosed in Pat. No. 3,067,433 and reference may be had to that patent for specific details of these components.

Additionally, the sewerage system of the present invention is provided with liquid level sensor 16 mounted on the cover of the closed tank 10 and adapted to measure a predetermined upper liquid level and lower liquid level in the closed tank. It will also be noted that a container 17 operated through the solenoid 18 is provided to inject a predetermined amount of a chemical additive into the closed tank for color and odor control in a manner to be described below. The closed tank 10 also has incorporated in it rinsing means which is somewhat schematically indicated at 19 and which also may take the form of the rinsing means shown in the aforementioned Pat. No. 3,067,433.

In accordance with the principles of the present invention, a second tank 20 of somewhat smaller capacity than the closed tank 10 is also provided; tank 20 having a cover 21 sealing the interior thereof, drainage means 22, a liquid level sensing mechanism 23 to sense an upper liquid level and a lower liquid level in the tank 20, a rinsing mechanism 24, a vent line 25, incorporating a splash guard 26, and heating means 27, which are shown as elements embedded in the walls of the tank 20, but which obviously may take a variety of forms. It is desirable, however, that the heating means be positiond below the lower liquid level referred to above. The tanks 10 and 20 are interconnected by the conduits 30 and 31 which are joined at the three way solenoid operated valve 33 which also serves to interconnect the bowl 14 with the tank 10 through the conduit 34.

A control box 40 interconnects the various components of the system by means of the lines 41, 42, 43, 44, 45, 46 and 47 and insures that the functions of the system will be coordinated in a manner to be described below.

In operation, the closed tank 10 is first primed with water and chemical additives for odor and color control up to a predetermined lower level in the tank 10. As in the system described in detail in Pat. No. 3,067,433, liquid from the tank 10 is withdrawn therefrom by the pump 13 and recirculated to the bowl 14 to flush it and discharge the contents thereof through the outlet 15 back into the tank 10. Waste accumulates therein until the level of total wastes, liquid and solid, reaches a preset upper liquid level in the tank 10. At this point, however, liquid level sensor 16 generates a signal through line 43 to the control mechanism 40 which first activates the valve 33 to interconnect the conduits 30 and 31 and then through line 45 activates the pump 13. The inlet end of the pump 13 is provided with a filter which may be of the type described in Pat. No. 3,429,445, and as a consequence only liquid wastes and perhaps, very finely divided solid wastes, are withdrawn from the tank 10 and deposited in tank 20.

When the amount of liquids pumped out of the tank 10 causes the level of liquids and solids therein to reach a predetermined lower level, the liquid level sensor 16 generates a signal through the line 43 to the control 40, deactivating the pump 13 and activating the valve 33 so that the bowl 14 and pump 13 are once again interconnected through conduits 30 and 34 and the conduit 31 is closed. Simultaneously, the solenoid 18 on the additive container 17 is actuated to inject a charge of odor and color control additives into the tank 10 to compensate for additives removed in the previous pumping cycle. At approximately the same time that pump 13 is deactivated, the liquid level sensor 23, sensing that the predetermined upper liquid level in the tank 20 has been reached, through the control 40 and line 46, energizes the heating elements 27.

It should also be noted that as an alternate construction the lower level sensing portion of the sensor 16 may be eliminated and the functions thereof assumed by the upper liquid level sensing portion of the sensor (i) means for venting said second tank, (j) liquid level sensors positioned in said closed tank and said second tank, each of said sensors operative to sense an upper and a lower liquid level in their respective tanks and generate signals in response to such sensing, (k) an altimeter associated with said second tank operative to generate a signal below a preset altitude and prevent activation of said heating elements in said second tank, (l) means for activating said pump upon generation of a closed tank upper liquid level signal, (m) means for activating said heater elements upon generation of a second tank upper liquid level signal, (n) means for deactivating said pump and delivering a measured amount of an additive to said closed tank upon generation of a closed tank lower liquid level signal, and (o) means for deactivating said heater elements upon generation of a second tank lower liquid level signal.

References Cited

UNITED STATES PATENTS

| | | | |
|---|---|---|---|
| 1,303,358 | 5/1919 | Montgomery | 4—115 |
| 3,067,433 | 12/1962 | Dietz et al. | 4—78 |
| 3,172,131 | 3/1965 | Herkenhine et al. | 4—115 |
| 3,342,341 | 9/1967 | Lee | 4—78X |
| 3,356,221 | 12/1967 | Katona et al. | 4—78X |
| 3,396,410 | 8/1968 | Gray | 4—10X |
| 3,473,171 | 10/1969 | Palmer | 4—78 |
| 3,487,475 | 1/1970 | Minniear | 4—10 |
| 3,501,778 | 3/1970 | Minniear | 4—10 |
| 3,522,613 | 8/1970 | Botsford | 4—133X |

LAVERNE D. GEIGER, Primary Examiner

H. K. ARTIS, Assistant Examiner

U.S. Cl. X.R.

4—10, 115